Patented Dec. 13, 1938

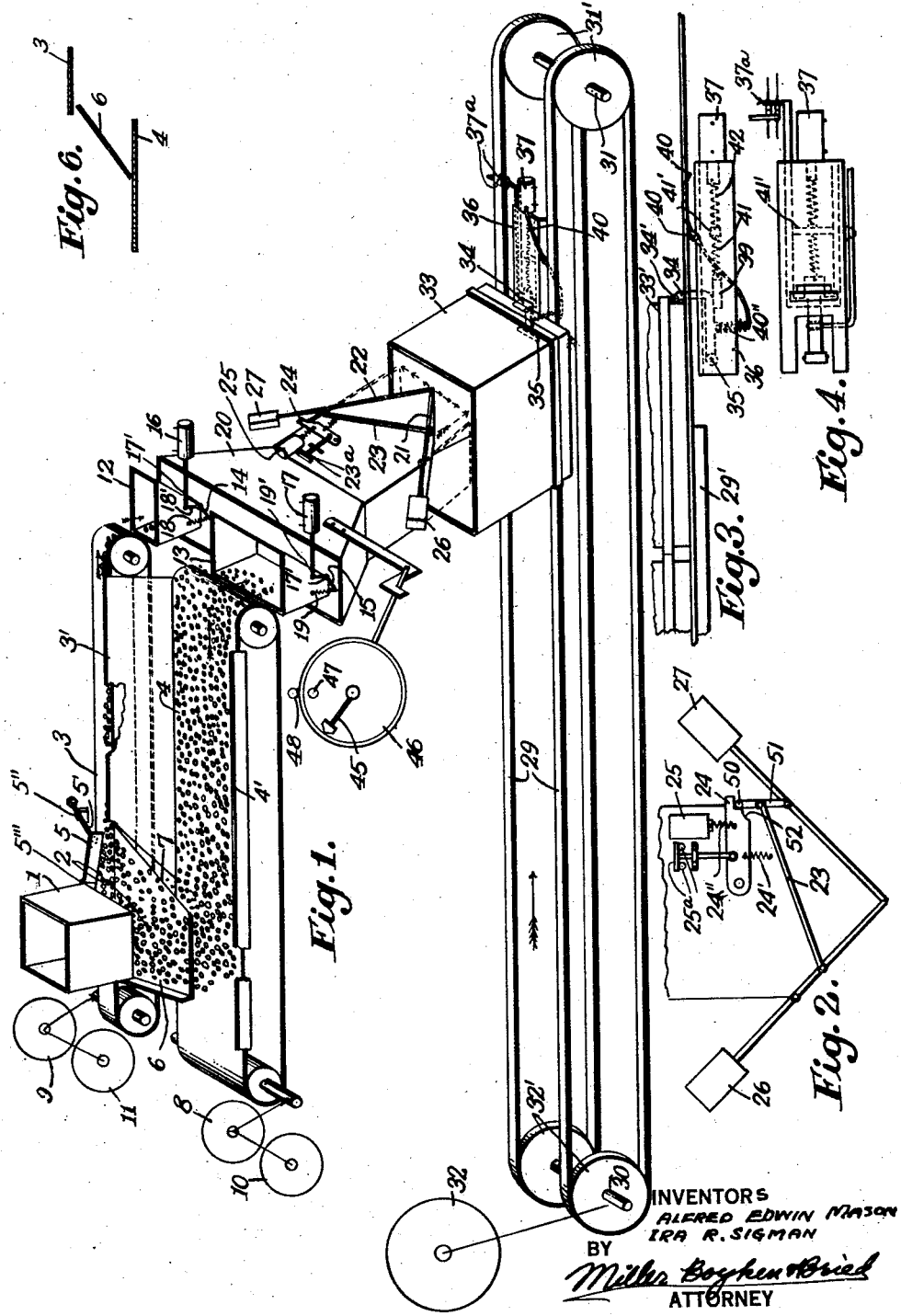

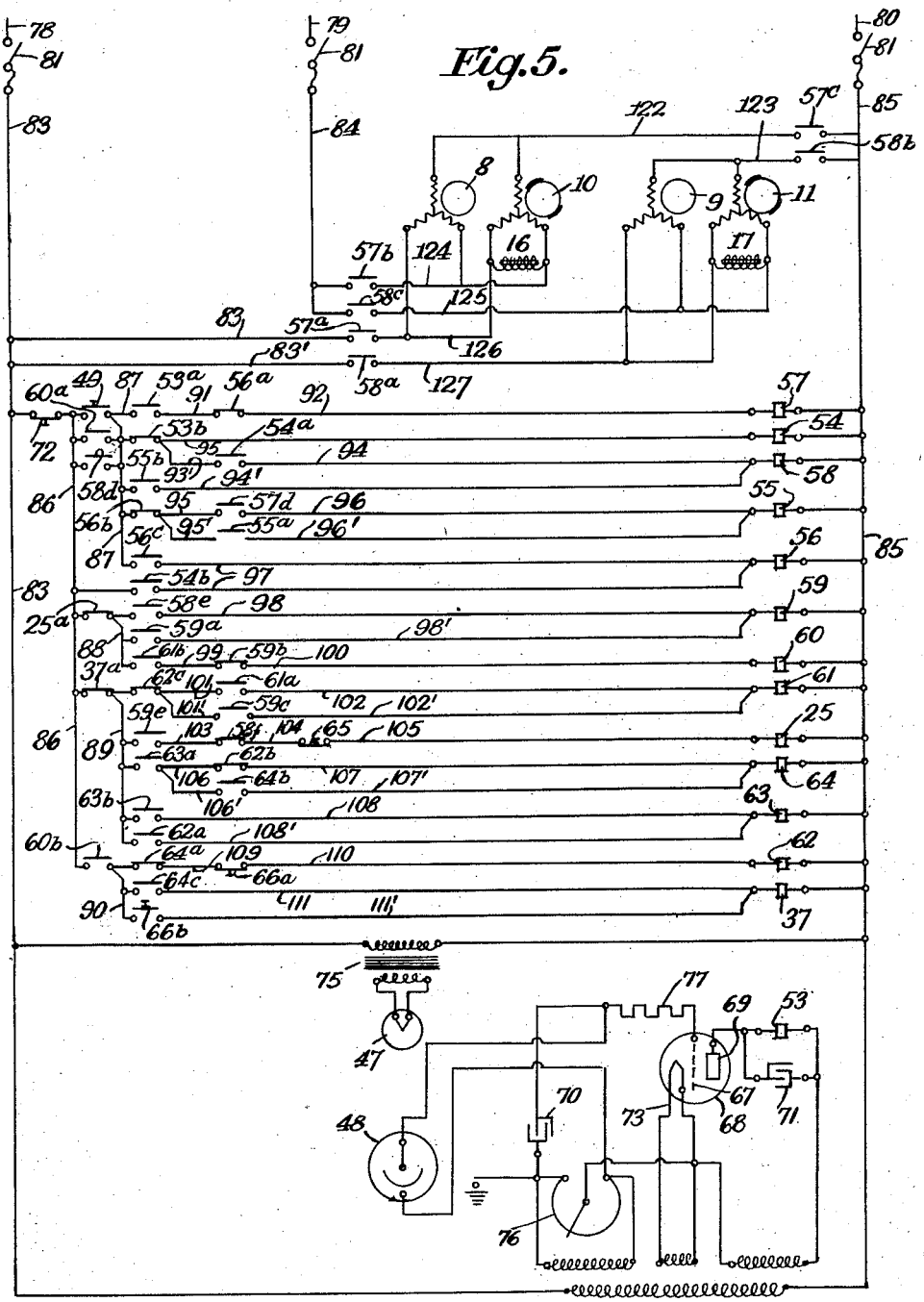

2,139,903

UNITED STATES PATENT OFFICE 2,139,903

AUTOMATIC WEIGHING DEVICE

Alfred Edwin Mason and Ira R. Sigman, San Francisco, Calif.

Application January 12, 1937, Serial No. 120,197

4 Claims. (Cl. 249—43)

This invention relates to automatic weighing devices and has for its objects the provision of improved apparatus for quickly and accurately weighing batches of material and for successively discharging the weighed material into successively positioned containers, the steps of delivering the material for weighing, the weighing, the discharging of the weighed material and the proper positioning of the containers and removal of the filled containers being automatic. Another object is the provision of a photo-electric control arranged for controlling the successively repeated cycles of operation of the apparatus. Other objects and advantages will appear in the specification and drawings.

In the drawings, Fig. 1 is a diagrammatic view of our apparatus.

Fig. 2 is a fragmentary elevational view of the discharge mechanism of the weigh hopper.

Fig. 3 is a fragmentary elevational view of the box release mechanism.

Fig. 4 is a plan view of the box release mechanism.

Fig. 5 is a schematic view of the electrical circuit.

Fig. 6 is a sectional view showing the relation of the two conveyor belts.

In detail, we provide a main feed hopper or suitable delivery chute 1, positioned to feed material 2, onto a dribble conveyor 3, and onto a volume conveyor 4. A deflector plate 5 partially extends across the dribble a portion of the material discharged onto the conveyor 3, onto a downwardly slanted plate 6, for sliding of the diverted material onto conveyor 4, which latter conveyor is at a lower elevation than the dribble conveyor. The plate 6 is cut off at a slant as at 7 along one edge to insure an even distribution of the material thereover onto conveyor 4. It is to be noted that the feed chute also feeds material directly onto plate 6, thus the material from the chute is spread out upon passing over plate 6, so as to be distributed fairly evenly on the volume conveyor 4. Suitable barriers or flanges 3', 4' are placed alongside the conveyors 3, 4 respectively to prevent spilling of the material over the side edges of the conveyors.

Conveyors 3, 4 are preferably of the beltconveyor type, each being mounted at opposite ends on suitable, separate pulleys, as indicated. An electric motor 9 is connected to drive dribble conveyor 3 in the direction of the arrow and has a conventional magnetic brake 11 for instantly stopping actuation of the motor and conveyor when the current is broken to the motor. A second electric motor 8 is connected to drive volume conveyor 4, which motor is also provided with a magnetic brake 10 to insure stopping of said motor and volume conveyor.

When both conveyors are in operation and material is continuously being fed thereon from the feed chute, it will be seen that a relatively thin row of material is carried along the dribble conveyor while a relatively large amount is carried by the volume conveyor, the latter conveyor being much wider than the dribble conveyor and adapted to carry all the material that is dropped from the feed chute except that permitted to pass by the end of deflector plate 5 without being forced onto the slanted plate 6. Deflector plate 5 is preferably adjustable so as to vary the quantity that is permitted to remain on conveyor 3, one form of adjustment being a screw 5' threadedly mounted in a stationary bracket 5" the plate being hinged at 5''' to swing back and forth across the path of travel of the material on conveyor 3.

In the actual machine conveyors, 3, 4 are spaced laterally at adjacent edges only the width of barrier 3', hence none of the material falling over edge 7 of plate 6 will fall between the belts (see Fig. 6). In Fig. 1 the belts are shown as being spaced for purposes of clarity in showing the various elements.

The material 2, such as prunes, for example, passes over the end of conveyor 3 into a stationary hopper 12, and from conveyor 4 into stationary hopper 13. These hoppers 12 and 13 are respectively provided with gates 14 and 15 at their lower open ends, said gates being hinged at 17' to close the lower ends of the hoppers under the influence of coil springs 18 and 19 and are held open by solenoids 16 and 17 through crank connections 18' and 19'. Torsion spring may, of course, be substituted for the coil springs.

The gates 14 and 15 respectively, are normally held open by the solenoids 16 and 17 when the dribble and volume feed conveyors are in motion so that the material dropping into the hoppers passes by the gates into a weigh hopper 20, which weigh hopper is provided with downwardly converging gates 21 and 22 that are hinged at their upper edges to opposite sides of the hopper and meet at their lower edges, thus the engaging ends of the gates form a downwardly pointed apex. The gates are pivotedly connected for movement together by a link 23, and are held in closed position by a releasable latch 24, which latch is releasable by operation of a solenoid 25 connected thereto. The gates are counterweighted at 26 and 27 to automatically swing shut when the latch 24 is released and there is no weight of material on the gates. The latch mechanism will be later described more in detail. The weigh hopper may be suspended for movement to actuate the pointer 45 if indicating scale device 46 in a conventional manner, such as shown in United States patent to Everhard, August 14, 1934, No. 1,970,291. The gates 14 and 15 may, of course, be radial undercut gates, which construction in some installations by applicant have been adopted as being preferable.

Below the lower end of the weigh hopper, is a belt or chain conveyor 29 comprising spaced parallel runs of belt or chain, preferably the former, supported at opposite ends of parallel shafts 30, 31 suitably pulleys 31', 32', said conveyor being continuously actuated in the direction of the arrow by an electric motor 32 or other source of power. The upper run of the belt may be slidably supported on a table 29' (Fig. 3) so as not to sag under the weight of containers 33. The containers 33 are carried by the belt to a point below the discharge gates of the weigh hopper.

Between the upper runs of the conveyor is a vertical pivoted stop 34 having a roller 34' at its upper end. Said stop is of L shape generally with one arm horizontal and the arm 34 carrying the roller, being vertical. The outer end of the horizontal arm is pivoted at 35 to an inverted stationary channel member 36, and stop 34 with its roller 34' is held in elevated position in the path of the oncoming containers to stop the leading container below the discharge opening of the weigh hopper while the belt will continue to slide below the container until the stop and roller are withdrawn from engagement with the forward side of the container.

The stop 34 is released from "stop" position by actuation of a solenoid 37, the core of which is connected to a member 39 that is horizontally slidable to and from a position below the stop. When the solenoid is energized the member 39 is pulled from under the stop permitting it to fall and permitting the box or container to ride over the roller. Thus the stop 34 is not free to rise to block the advance of the next container on the belt until the container has passed beyond the stop.

Slightly in advance of the stop 34 is a pivoted box resetting lever 40 that is pivoted at 40' to the channel member said lever extending upwardly at one end from the pivot 40', and in the direction of travel of the upper run of the belt to a point above the upper surface of the belt. The lever also extends downwardly at its opposite end to a point below the horizontal arm of stop 34. A compression spring 40'' is interposed between said opposite end and stop 34, whereby upon the container engaging the upwardly end of the lever, said upper end will be depressed, allowing the container to pass thereover, and also placing spring 40'' under compression to yieldably tend to force the stop 34 upwardly. As soon as the rear edge of the first box clears the stop the tension on the spring immediately will force the stop up to the space between collars 33', or any other suitable spacing means between the containers, to stop the second or next container below the weigh hopper.

The connection between the solenoid core and member 39 comprises a pair of axially aligned springs 41 and 42 with adjacent ends connected to a cross bar 41', the spring 42 being relatively stiff and connecting between said bar and solenoid core, while spring 41 is relatively light and connects between the bar and member 39. The spring 42 functions as a semi-rigid element, being relatively stiff, for forcing the member 39 back to position below the stop 34 when the solenoid is de-energized, a conventional coil spring being within the solenoid for returning the core. The light spring 41 acts as a delayed release of the stop due to its resiliency. Carried by cross bar 41' is a switch 37a that is adapted to function in an electrical circuit for a purpose later described.

As already stated, the weigh hopper is suspended by any suitable scale balance supporting means, such as in the Everhard patent, supra, and is arranged to actuate a pointer 45 of a scale dial 46. The pointer 45 carries a light intercepting shield adapted to mask the light from a light source 47 of a photo-electric cell 48 when the material deposited in the weigh hopper closely approaches the desired weight, which masking functions to cause motor 9 and the volume conveyor to stop and to de-energize solenoid 17 for closing gate 15. Upon the pointer continuing its travel due to the dribble feed of material, the light source will be restored by unmasking the light and this causes the motor 8 and dribble conveyor to stop, and to also de-energize solenoid 16 whereby gate 14 will close. The point where the light source is unmasked by the pointer naturally takes into consideration the factors of inertia, time, material in suspension and lag of moving parts.

It will be noted (Fig. 2) that the latch 24 on the weigh hopper mechanism is pivotally mounted at one end and the free end is notched to engage a projection 50 on the free end of an arm 51, which arm is secured at its opposite end to gate 22 for moving therewith about the axis of the gate hinge. When the gate 22 is closed the projection 50 slides into the notch at the free end of the latch, automatically locking the gate closed, latch being pulled downwardly by a spring 24'. The core of solenoid 25 is yieldably connected by a spring 24'' arranged to move the free end of the latch out of engagement with the projection 50 when the solenoid is energized, thus permitting the gate 22 to open under the weight of material within the weigh hopper, and gate 21 will likewise open with gate 22 and be locked closed by latch 24 by reason of the connecting link 23 that is pivotally connected at one end to gate 21 below the hinge thereof and at the opposite end to arm 51 at a point between the opposite ends of said arm. Also carried by the latch 24 is a switch 25a, which switch is in the electrical circuit and is normally closed when the gates are closed and opened when the gates open, said switch functioning in said circuit when closed upon the closing of the gates to re-start the volume and dribble conveyors. The gates themselves will automatically close and be locked in closed position under the influence of the counterweights 26, 27 when the material in the weigh hopper has been discharged.

Assuming the main line switches in the electrical circuit are closed, the sequence of operation of the apparatus is as follows:

The dribble and volume conveyors deposit the material to be weighed through hoppers 12, 13, the solenoids 16, 17 being energized to hold the hopper gates 14, 15 open, and into weigh hopper 20, gates 21, 22 being locked in closed position by latch 24, the solenoid 25 being de-energized. As the weight of the material in the weigh hopper increases, pointer 45 with its masking shield moves around toward the light beam of the photo-electric cell assembly. The pointer has been previously set so the shield will cover the ray of light at a point where the weight of material in the hopper is slightly short of the desired weight, and as soon as the shield masks the light ray, an electrical circuit functions as a result of the masking of the light to stop the volume conveyor motor and to set its brake and the solenoid 17 is de-energized to permit spring 19 to close the gate of hopper 13 whereby any material that might be in suspension between the gate 15 and discharge and of conveyor 4 is prevented from falling into the weigh hopper.

The dribble conveyor continues to discharge a relatively small amount of material into the weigh hopper, thus continuing the movement of the pointer 45 and as soon as the shield on the pointer unmasks the light ray, an electrical circuit functions thereupon to stop the dribble motor, set its brake; to de-energize solenoid 16 whereby gate 14 immediately closes; to energize solenoid 25 whereby weigh-hopper gates 21, 22 open and the material in the weigh hopper will fall into container 33. Upon the gates closing under the influence of their counterweights, the switch 25a is again closed and solenoid 37 is energized to withdraw stop 39 and to allow the filled container to pass from below the discharge chute of the weigh hopper and to position the succeeding empty container below said hopper for receiving the subsequently weighed batch of material and the volume and dribble conveyors are started to refill the weigh hopper for repeating the cycle.

In the schematic view, the solenoids 16, 17, 25 and 37 are similarly numbered to those described in Fig. 1 and the switch actuated by energizing and de-energizing 25 is numbered 25a. Likewise the switches actuated by energizing 37 is numbered 37a. The relay coils in the circuit are numbered from 53 to 64 inclusive and the switches actuated by each of the coils upon their being energized and de-energized bear the corresponding number of the coil but followed by letters a, b, etc. The explanation will initially describe a two-dump operation of the weigh hopper gates before a removal of the container and will show the single dump operation by the actuation of a switch in the circuit so either operation as desired may be employed.

In the schematic view, the closing of main switches 81 energizes lines 83, 84 and 85 thus lighting bulb 47 through transformer 75 and energizing photo tube 48 and amplifier tube 68, the latter comprising grid 67 and plate 69. The sensitive relay coil 53 is thereby energized and normally open switch 53a is closed while normally closed switch 53b is opened. Start button 49 is then closed and current passes from line 83 through stop button 72 to lines 86, 87 line 91 switch 56a line 92, relay coil 57 to line 85, thus energizing coil 57. Coil 57 closes switches 57a, 57b, 57c and 57d, starting dribble motor 8 and releasing brake 10 and energizing solenoid 16 through lines 83, 84, 85, 124, 122 and 126. Current also passes from line 87 through normally closed switch 56b, line 95, now closed switch 57d, line 96, relay coil 55 to line 85 thus energizing coil 55. Coil 55 closes its own holding in circuit from line 95' through now closed switch 55a, and line 90', and switch 55b also closes energizing coil 58 through lines 87, 94 and 85 and coil 58 in turn closes switches 58a, 58b and 58c making circuit 83, 83', 127, 123, 84, 125 to 85 thereby releasing brake 11, starting volume motor 9 and energizing solenoid 17, which solenoid holds the gate of hopper 13 open. Both volume and dribble conveyors are now operating to deposit material into weigh hopper 20 through gates 14, 15 which gates are held open by solenoids 16, 17.

The energizing of coil 58 also closes lines 86 to 87 through switch 58d thus maintaining a holding in circuit and allowing release of start button 47. Coil 58 also closes switch 58e allowing current to pass from line 86 through normally closed switch 25a to 83 making a circuit through line 88, switch 58e line 98 to line 85 through relay coil 59, energizing coil 59. Normally closed switch 58f is opened upon energizing coil 58 in lines 103, 104 thus preventing the energizing of relay or solenoid 25 while coil 58 is energized.

The energizing of coil 59 closes switch 59a thereby forming its holding in circuit through lines 88, 98', preventing coil 59 from dropping out when coil 58 is de-energized. Also normally closed switch 59b opens to break circuit 88, 99, 100, coil 60 to 85 preventing coil 60 from becoming energized while coil 59 is energized and switch 59c is closed making closed circuit 101', 102' and 85 and energizing coil 61 through switches 37a, 62c. Coil 61 in turn forms its own holding in circuit from 101 to 102 through closing switch 61a, making possible for it to stay energized when coil 59 drops out and switch 61 is also closed to make circuit 88, 99 so coil 60 may pick up or become energized when coil 59 drops out and switch 59b closes.

As both feed conveyors have been operating the interceptor or pointer 45 will have approached the light of the photo-cell hook-up and immediately upon its cutting off the light the coil 53 drops out and switch 53a opens dropping out coil 57. Switch 53b closes thus energizing coil 54 through lines 93, 85 and the energizing of coil 54 closes switch 54a making circuit 93', 94 supplying current to coil 58 through switch 53b, lines 93', 94 and 85. Coil 54 upon being energized also closes switch 54b connecting lines 36, 97 and energizing relay coil 56 by way of line 85, which coil 56 forms its own holding in circuit by closing switch 56c which connects lines 87 and 97.

The energizing of coil 56 drops out coil 55 by opening switch 56a and switch 55b then opens to break lines 87, 94' making coil 58 take its energy by way of lines 93' and 94 through switch 54a.

When coil 57 was dropped out by opening switch 53a through the interruption of the light ray, the volume motor stopped, its brake was set and the volume hopper gate was closed by de-energizing of solenoid 17, but the dribble conveyor continued to feed material into the weigh hopper at a low rate of speed and the interceptor continued its travel across the light ray.

When the interceptor uncovers the light ray the relay coil 53 will again be energized closing switch 53a. As relay coil 56 has already opened switch 56a it is seen that coil 57 is not energized by this action. Coil 53 also will now open switch 53b thus dropping out relay coils 54, 58. The dropping out of coil 58 results in actuation of switches 58a to 58f to the position shown in the schematic drawings, thus motor 9 is stopped, its brake set, solenoid 17 is de-energized and gate 15 closes. The desired weight is now in the weigh hopper.

The dropping out of relay coil 58 results in opening switch 58d, thus dropping out coil 56 which results in opening switch 56c and closing switches 56a and 56b, whereby coil 54 is energized to open switch 54b thus placing the double cutoff control in a pre-first starting condition.

Coil 58 will have operated to open switch 58e and to close switch 58f, when said coil dropped out, and solenoid 25 will be energized through current passing through a check-weigh switch 65 and lines 104, 105 and 85. The energizing of solenoid 25 releases the latch 24 (Fig. 1) thus allowing gates 21, 22 of the weigh hopper to open under the weight of the material therein to discharge the material into container 3, and gates 21, 22 then will automatically close. The opening of the gates opened switch 25a thus dropping out relay coil 59 and thereby closing switch 59b and when the gates again close, switch 25a closes whereby relay coil 60 is energized through switches 61b, 59b. The energizing of coil 60 closes switch 60a thus connecting lines 86, 87 and starting the volume and dribble motors and conveyors.

When coil 59 was dropped out, this resulted in opening switches 59c, 59e, the last switch making it impossible for coil 25 to be re-energized until 59e has again closed. Also, coil 60 closed switch 60b thus energizing coil 62 through normally closed switch 64a and a closed switch 66a, said coil 62 and switches 64a, 66a, being in circuit 90, 109, 110 and 85.

The energizing of coil 62 closed switch 62a in circuit 88, 108' thus energizing relay coil 63 through closed switches 37, 62a in the circuit 89, 108' and 85 and also switch 62b in lines 106, 107 is opened whereby coil 64 is prevented from being energized when switch 63a is closed. Coil 62 also acts to open switch 62c, thus dropping out relay coil 61, which dropping out of coil 61 results in opening switch 61b and dropping out relay coil 60. The coil 60 having accomplished its purpose of re-starting the double cut-off controls, its dropping out results in opening of switch 60b thus dropping out coil 62, but coil 63 remains energized by having closed switch 63b which forms its holding in circuit from 89 to 85 by way of line 108, and coil 63 has closed switch 63a thus energizing coil 64 which is in circuit 108 to 85.

Coil 64 forms its own holding in circuit independent of coil 62 by closing switch 64b in lines 106', 107', and the energizing of coil 64 also opened switch 64a thus making it impossible for 62 to again pick up until coil 64 has been dropped out. Also coil 64 when energized, closes switch 64c in lines 90, 111 to 85 making possible for solenoid or coil 37 to become energized when coil 60 closes switch 60b.

The second batch of material is now being fed into the same container 3, and when this second batch is discharged the coil 60 will again be energized through actuation of switch 25a and solenoid or coil 37 will have energy from line 86 through switches 60b, 64c and line 111 to line 85 and the energizing of coil 37 will open switch 37a thereby dropping out coils 63, 64, the coil 60 having previously carried on the re-starting operation.

From the above it is seen that with the setting of mechanical switch 66a closed, two batches of material must be deposited from the weigh hopper before solenoid 37 is energized and the box release stop 34 (Fig. 3) is dropped so the container 3 can move forward and re-close switch 37a to stop the next container below the weigh hopper. If on the other hand switch 66a were set "open" and mechanical switch 66b mechanically connected thereto were set "closed", then coil 62 would not be energized and switch 60b would close the circuit through switch 66b to solenoid 37 allowing the release of container 3 on the first discharge. The operations described automatically will take place once every 6 or 7 seconds when the machine is in operation.

Relative to the photo-electric amplifier in the circuit, when the potential of the grid 67 of tube 68 changes between certain values, the anode or plate (69) current changes accordingly. The grid potential is obtained from a bridge circuit in which one length is a constant impedance (condenser 70) and the other leg a variable impedance (photo-tube 48). When the light shines on tube 48 its impedance decreases, therefore the voltage across the tube decreases and the amplifier tube grid becomes less negative. The anode current increases and sensitive relay 53 is energized. When the light decreases, this action is reversed and the amplifier tube passes less current and sensitive relay drops out. A condenser 71 is connected across the coil of the sensitive relay 53 to smooth out the pulsating D. C. The cathode of the photo-electric amplifier tube is designated 73, a grid bias adjusting rheostat is designated 76 and a grid limiting resistor is designated 77.

With reference to the main control circuit, the switch 65, referred to as a check-weigh switch in the description is inserted in the circuit so as to enable interrupting the sequence of operations so as to determine the accuracy of the final cut-off, and as already explained, switches 66a and 66b are selector switches to control the discharge of one or two loads of weighed material into one container, as desired, before the container is released.

The scale lever actuated by the movement of the weigh hopper is connected with a conventional dash-pot, not shown, to prevent the indicator from traveling too far ahead of the actual weight of material in the weigh hopper, since the impact of falling material and material in suspension about to come to rest in said hopper will influence the weight of ultimate material deposited therein, and even though the action of the photo-electric relay is practically instantaneous, there is a certain lag between the time the impulse is received from the photo-cell until the flow of material into the weigh hopper is stopped. All these factors will effect the speed and accuracy with which material can be handled and weighed, and the circuit and arrangement of elements as described are found to give far greater efficiency than heretofore found in apparatus intended to accomplish generally the same result, insofar as applicants are aware. With the arrangement shown, there is a minimum of electrical and mechanical actions taking place from the time the photo-electric cell receives its impulse to the actual stoppage of material since there are no interposing electrical control actions between the operation of the sensitive relay 53 and relays 57 and 58 which control the equipment that actually controls the flow of material. Time lag is thereby practically eliminated. This is extremely important inasmuch as the dash-pot control is greatly dependent for ultimate efficiency upon a minimum time lag, and the greater the lag the greater the variation in weight of successive batches of material discharged from the weigh hopper.

In actual practice, apparatus made according to my invention, will weigh from 500 to 550 boxes of prunes per hour in lots of 25 pounds of prunes per box with an average tolerance of plus or minus one-half ounce, the feed to the volume and dribble conveyors being uniform and the prunes being of 30/40 grade as compared with average tolerances in excess of 3 ounces by any other method of which I am awere. Where raisins are being weighed in 25 pound lots, the average tolerance with my apparatus is even less than ½ ounce and the capacity of the apparatus is from about 550 to 600 25 pound boxes per hour.

Having described our invention, we claim:

1. In apparatus of the character described, a volume conveyor and a dribble conveyor arranged and adapted to respectively carry and discharge a relatively large and relatively small amount of material therefrom, a volume hopper and a dribble hopper respectively arranged relative to the conveyors to receive the material discharged from the volume and dribble conveyors, said volume and dribble hoppers each provided with a discharge opening and movable closure therefore, a weigh hopper positioned to receive material from the discharge openings of the volume and dribble hoppers, the weigh hopper being provided with a discharge opening and closure therefore, power means arranged for simultaneously and separately actuating the conveyors, the closures of the volume and dribble hoppers being normally open and the weigh hopper closure being normally closed when both conveyors are actuated to carry and discharge material therefrom, means actuated by the weight of material in the weigh hopper for stopping the volume conveyor and for moving the volume hopper closure to closed position and means actuated by a predetermined added weight of material in the weigh hopper for stopping the dribble conveyor and for moving the dribble hopper closure to closed position and for opening the weigh hopper closure to discharge the material therefrom, means arranged to automatically close said weigh hopper closure upon discharge of material therefrom, means operated by movement of the weigh hopper closure for re-starting the conveyors and opening the volume and dribble hopper closures to passage of material into the weigh hopper.

2. In apparatus of the character described, a balanced movable weigh hopper, a pair of conveyor belts arranged for feeding material thereto, an electric motor connected to each feed belt respectively for independently driving each belt, a movable bottom on said weigh hopper for supporting material fed thereto, separate movable means associated with each feed belt between each belt and the weigh hopper arranged for intercepting material fed from the belt to the hopper, an electrical circuit, separate electrically actuated means in said circuit connected to each motor, said movable bottom, and said movable means respectively arranged and adapted for actuation by movement of said weigh hopper under influence of the weight of material therein for successively stopping said electric motors and for moving the movable means associated with each belt to intercept the material fed thereby simultaneously with the stoppage of the belt, and for moving said movable bottom to release the material in weigh hopper upon stoppage of both motors and for starting the motors, means for moving said movable means out of intercepting position actuated by movement of said bottom to material supporting position, and means for mechanically moving said bottom back to supporting position.

3. In a construction as defined in claim 2, said separate electrical means including a separate solenoid operatively connected to each of said movable means and bottom.

4. In a construction as defined in claim 2, said separate electrical means including a separate solenoid connected to each of said movable means adapted to hold said movable means in non-intercepting position when the solenoid is energized and the mechanical means for moving said bottom back to supporting position being gravity actuated.

ALFRED EDWIN MASON.
IRA R. SIGMAN.